United States Patent [19]

Wolff

[11] 4,025,930
[45] * May 24, 1977

[54] SUBMERSIBLE CAMERA

[76] Inventor: Clifford Wolff, 67 Brook St., Islip, N.Y. 11751

[ * ] Notice: The portion of the term of this patent subsequent to Jan. 14, 1992, has been disclaimed.

[22] Filed: Jan. 12, 1976

[21] Appl. No.: 648,199

[52] U.S. Cl. .............................. 354/64; 354/266; 352/174; 352/242
[51] Int. Cl.² ..................................... G03B 17/08
[58] Field of Search ............ 354/64, 195, 266, 288; 352/34, 139, 169, 174, 179, 242

[56] References Cited

UNITED STATES PATENTS

| 3,860,937 | 1/1975 | Wolfe | 354/64 |
| 3,899,790 | 8/1975 | Pocachard | 354/64 |

Primary Examiner—L. T. Hix
Assistant Examiner—Alan Mathews
Attorney, Agent, or Firm—Flynn & Frishauf

[57] ABSTRACT

A submersible camera having a waterproof housing has a plurality of magnetically operated switches for controlling normal shutter operation, self-locking operation and zoom functions. The camera is electrically operated with the electrical operating mechanism interconnected with the magnetically controlled switches. The switches do not penetrate the housing and provide simple and reliable control of the camera.

21 Claims, 13 Drawing Figures

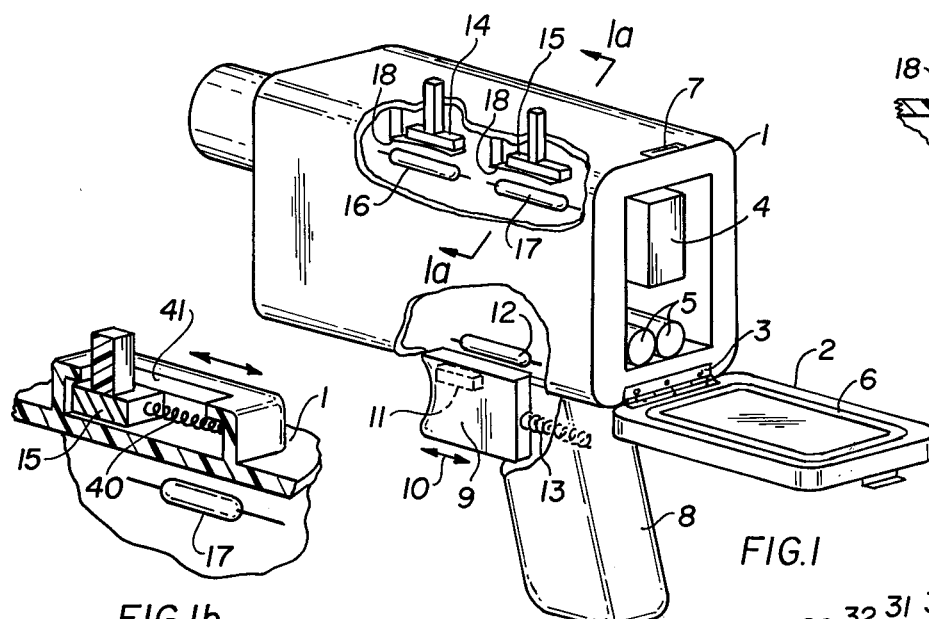
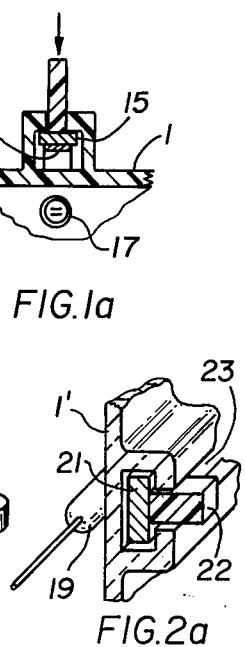
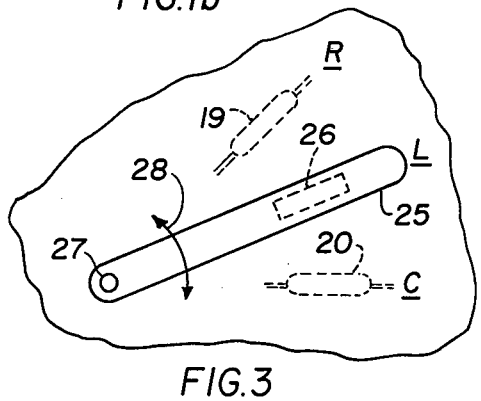
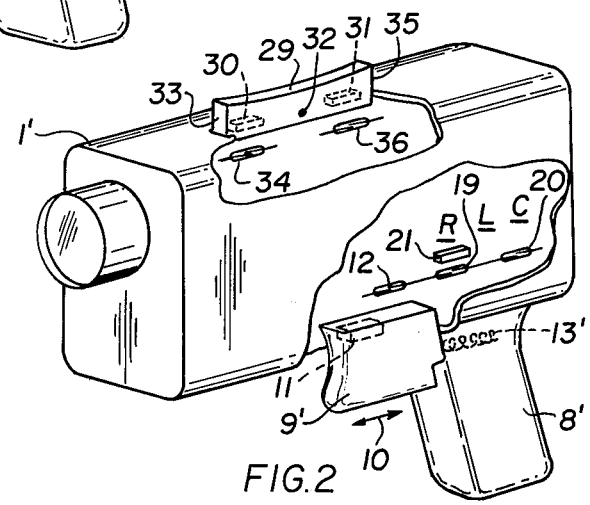
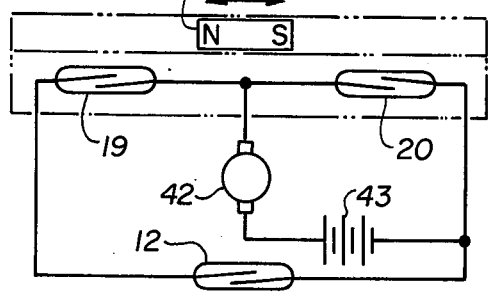
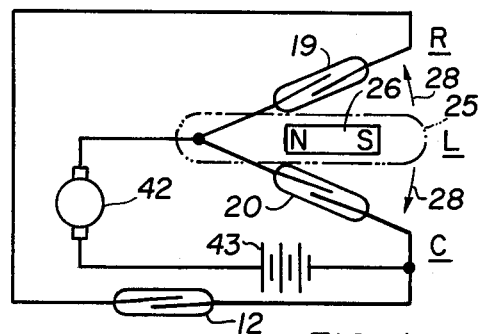
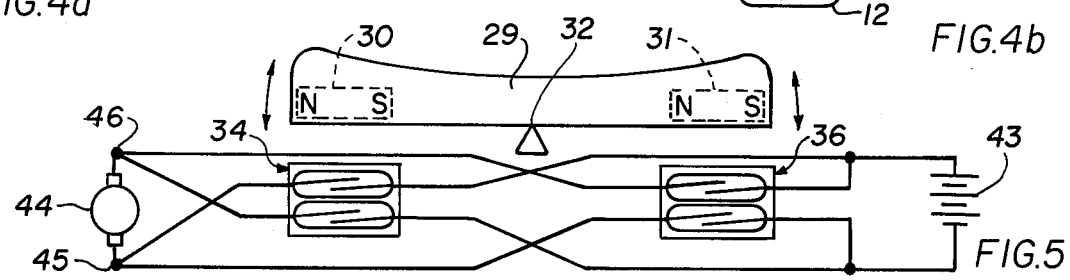

SUBMERSIBLE CAMERA

CROSS-REFERENCE TO RELATED PATENT

U.S. Pat. No. 3,860,937, issued Jan. 14, 1975 to Clifford Wolff, the entire contents of which is incorporated herein by reference.

BACKGROUND OF THE INVENTION

This invention relates to a submersible electrically operated camera having magnetically operated controls which do not penetrate the housing thereof.

The present invention is particularly applicable to motion picture cameras and the invention is described in detail in connection with same. However, the concepts described and claimed herein are generally applicable to certain types of still picture cameras which may be electrically operated.

Waterproof camera housings for underwater photography and submersible cameras are generally well known in the art. However, most housings and waterproof cameras are generally of a complex nature and have mechanical couplings passing through the walls of the waterproof portion thereof. An exception is the housing disclosed in my earlier U.S. Pat. No. 3,860,937. Mechanical mechanisms which penetrate housings of submersible cameras and housings render them relatively expensive, complex and difficult to use. Moreover, due to the mechanical couplings passing through the housings, the reliability of the liquid tight seals become reduced with age.

The main object of the present invention is to provide an improved waterproof and submersible camera, which is waterproof and submersible per se without the necessity of inserting same in a waterproof housing, and which is of simple construction, relatively inexpensive to fabricate, which provides highly reliable water tightness and which includes an operating mechanism which does not penetrate a wall of the camera housing or body.

SUMMARY OF THE INVENTION

In accordance with the present invention, an electrically operated camera includes a waterproof housing. Inside of the waterproof housing is at least one magnetically operated switching element which is interconnected in the electrical operating circuit of the camera. Outside of the housing is located a magnet associated with the respective switch, the magnet being movable substantially parallel to a surface of the housing adjacent which it is located into communication with the magnetically operated switching device within the housing for actuating the magnetically operated switching device, thereby operating an electrical circuit of the camera. The housing of the camera is fabricated of a material through which the magnetic field produced by the magnet located outside the housing can easily pass through so as to act on the switching device inside the housing with a high degree of reliability.

In accordance with a feature of the invention, the camera includes an electrically operated zoom feature which is selectively operated by magnetically operated switches, the switching portion being located within the housing and the magnetic actuators being located outside the housing.

BRIEF DESCRIPTION OF THE DRAWINGS

FIGS. 1 and 1a illustrate an embodiment of the present invention as applied to an electrically operated zoom-type movie camera;

FIG. 1b illustrates a modification of FIGS. 1 and 1a;

FIGS. 2 and 2a illustrate another embodiment of the invention as applied to an electrically operated zoom-type movie camera;

FIG. 3 illustrates a modification of the embodiment of FIGS. 2 and 2a;

FIGS. 4a and 4b illustrate typical circuits for a movie camera to provide "run", "lock" and "continuous" operation of the shutter and film drive mechanisms;

FIG. 5 illustrates a typical magnetic switch circuit for use in controlling the zoom function of an electrically operated zoom-type movie camera;

DETAILED DESCRIPTION OF ILLUSTRATED EMBODIMENTS

Figure 6:
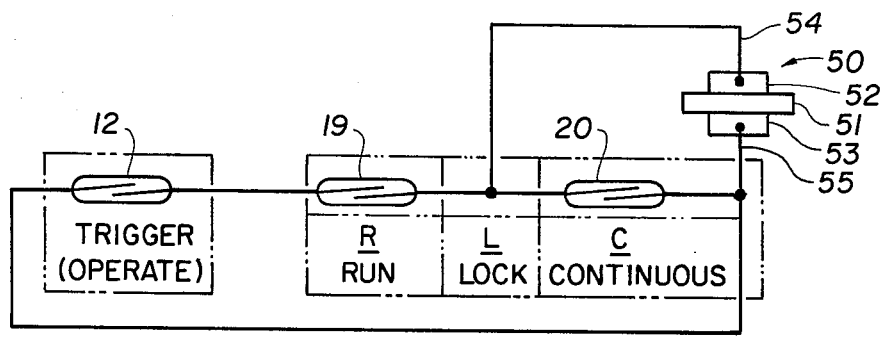
FIG. 6 illustrates a modified arrangement for controlling the shutter mechanism of a movie camera.

Referring to FIG. 1, a conventional-type electrically operated movie camera is contained within a waterproof housing 1. The housing 1 has an openable rear door 2 which is hingedly connected to the housing by means of, for example, a hinge 3 for insertion of a film cartridge 4 and batteries 5. The batteries may be contained in a battery holder which is removable from the housing for ease of insertion and removal of the batteries. The rear cover 2 is sealed to the housing 1 by means of, for example, a rubber gasket or O-ring 6. The rubber sealing member 6 is pressed between the door and the housing 1 when the door is closed and latched in the closed position by means of, for example a latch mechanism 7.

The housing 1 has a handle 8 extending therefrom and integral therewith. The handle 8 has a trigger 9 slidably mounted therein for movement in the direction of the arrow 10. A magnet 11 is embedded in the trigger 9 and cooperates with a magnetic switch 12 located inside the housing of the camera. When the trigger is moved to the right in FIG. 1, the magnet 11 comes into communication with the switch 12 and closes the contacts thereof so as to operate the shutter and film drive mechanism of the camera. The switch 12 replaces the conventional operating switch of a conventional electrically controlled camera. The trigger 9 has a spring 13 for biassing the trigger 9 in the outward or inoperative position. The housing 1 is made preferably of a clear plastic material through which a magnetic field may pass for operation of magnetic switches located therein.

The trigger switch arrangement 9, 11, 13 of FIG. 1 may be identical with the trigger switch arrangement 12, 13, 14 of my U.S. Pat. No. 3,860,937, the entire contents of which is incorporated herein by reference.

The embodiment of FIG. 1 also includes a magnetic switch arrangement for operating the zoom mechanism of a zoom-type camera. Magnets 14 and 15 are respectively associated with magnetic switches 16 and 17 which are electrically interconnected in the electrical zoom control circuitry of the camera, which may be conventional. Magnets 14 and 15 are operated so as to magnetically operate respective switches 16 and 17 by depressing same in the vertical direction toward the respective switches. A flat spring or coil spring 18 biasses the magnet 15 in the upward position, whereby it is out of magnetic communication with the switch 17. A similar biassing arrangement may be provided for magnet 14. Alternatively, the magnets 14 and 15 may be mounted in a rocker-type switch (discussed below with reference to FIG. 2) or be made slidable in the same direction as the arrow 10 to respectively come into and out of communication with respective switches 16 and 17, as shown in FIG. 1b. Magnet 15 is shown in FIG. 1b — magnet 14 and its associated structure is identical. A spring 40 biasses the magnet 15 in one direction out of communication with zoom control switch 17. Magnet 15 is retained under lip 41 of housing 1.

Typical circuits for the camera embodiment of FIG. 1 are shown in FIGS. 4a, 4b, 5 and 6.

Magnetic switches 12, 16 and 17 are, for example, well known reed switches or reed relays which are actuated when a magnet is placed in closed proximity thereto as described in my U.S. Pat. No. 3,860,937. Switches 12, 16, and 17 are "normally open" and are selectively closed under the influence of their respective magnets. The switches are, for example, mounted to the housing 1 with an adhesive, or the housing may be equipped with a receptacle means for mounting the switches therein.

FIG. 2 illustrates another embodiment of the invention utilizing a rocker-type magnetic switch for the zoom function and an additional three-position magnetically operated switching arrangement which is connected into a circuit with the trigger operated switch so that the camera may be selectively put into the lock, run, or continuous operational condition. The camera of FIG. 2 is contained within a waterproof housing 1' having a handle 8' with a trigger 9' slidable in the trigger 8'. The trigger 9' includes a magnet 11 (similar to that of FIG. 1) which is associated with a magnetically operated switch 12 (similar to that of FIG. 1). Connected in series with magnetic switch 12 are magnetic switches 19 and 20, which are also located within the housing 1'. Further provided is an additional slidable magnet 21 located outside the housing 1' but in selective magnetic communication with switches 19 and 20. See FIG. 2a. The magnetic member 21 is hand movable by means of an operating lever 22 secured thereto along a track 23 defined by the housing. The switches 12, 19 and 20 are interconnected to the series connection of a drive motor and the battery pack as illustrated, for example, in FIGS. 4a, 4b and 6.

When the magnet 21 is in the position indicated in FIG. 2, switch 19 is operated to its closed position. Therefore, when the trigger 9' is operated so that the magnet 11 is in communication with the switch 12, switch 12 closes and power is applied to the drive motor 42 (FIG. 4a) which drives the film transport mechanism and shutter mechanism in the conventional manner. In this run mode, operation of the camera is fully controlled by the trigger 9'.

When the magnet 21 is located in the lock position (L) it is located between the two switches 19 and 20 (see FIG. 2) and out of magnetic communication with the switches 19 and 20, so it does not operate either one of the switches. Thus, operation of the trigger 9' will be ineffective to operate the shutter drive mechanism of the camera. This effectively locks the shutter and drive mechanism of the camera agains inadvertent use.

When the magnet 21 is slid or otherwise moved to the continuous position (C) opposite the switch 20, power is applied to the motor 42 (FIG. 4a) regardless of the position of the trigger 9'. In this continuous mode, the camera may be set to operate continuously. This mode provides the advantage that the operator may get into the picture himself, or the camera may be set up at a remote position for continuous operation, as desired.

FIG. 2 is a highly schematic representation of the switching magnet 21 and its associated switches 19 and 20. A specific mechanical mounting of magnet 21 is shown in FIG. 2a. Detents may be provided to positively engage the magnet 21 in each of the R, L and C positions.

The above-described magnetically operated switching arrangement of FIG. 2 is advantageous in that it permits a high degree of flexibility in the operation of the camera in a simple manner which requires a minimum of mechanically operating components. Merely by providing slidable magnets adjacent a surface of the camera housing, full control of the electrically operated camera may be obtained.

The slidable magnet 21 may be replaced by a rotatable magnetic assembly such as shown in FIG. 3. In FIG. 3, a portion of the housing 1' is shown having a pivotable member 25 carrying a magnet 26 therein. Pivotable member 25 pivots about pivot pin 27 which may integrally protrude from housing 1'. locking indentations and/or protuberances may be provided on the housing 1 to cooperate with member 25 so as to provide positive engagement at the various positions thereof. Located within the housing are switches 19 and 20 which are the same as the corresponding switches 19 and 20 of FIG. 2 and which are electrically interconnected with the remaining camera circuitry in the same manner as those of FIG. 2. In FIG. 3, the member 25 is pivotable about pivot pin 27 in the direction indicated by the arrow 28. Member 25 is shown in the lock (L) position in FIG. 3, and is pivotable upward to the run (R) position and downward to the continuous (C) position. Electrical operation and interconnection is the same as that described above with respect to FIG. 2.

Both the embodiments of FIGS. 2 and 3 have a common feature in that the magnets 21 and 26, respectively are operable in a direction parallel to a surface of the camera housing.

FIG. 2 further includes a rocker-type switch 29 carrying respective magnets 30 and 31. Switch 29 is pivotable about a central portion, for example at pivot point 32. A spring biassing means is preferably provided so as to maintain the rocker switch in its neutral position. When the forward portion 33 of the rocker switch is depressed, magnet 30 comes down into communication with a magnetic switch 34 which comprises two adjacent normally open, single pole, single throw magnetic switches which are simultaneously operated so as to operate the zoom in a first direction, for example "zoom out". When the rear portion 35 of the rocker switch 29 is depressed, magnet 31 comes into communication with magnetic switch 36, which comprises two adjacent magnetic switches similar to switch 34 so as to operate the zoom mechanism in the opposite direction, for example "zoom in". Typical circuitry for the zoom mechanism of FIG. 2 is shown in FIG. 5. As mentioned above, the magnetic switches 34 and 36 are each comprised of two separate, simultaneously operated, switches located adjacent each other. Magnetic switches 34 and 36 may each be comprised of two adjacent separately encapsulated switches, or two switches may be located within a common encapsulation, such as glass or plastic, to form said switches 34 and 36.

The zoom control motor 44, which may be a conventional motor, and which is interconnected to the zoom mechanism in the camera in a coventional manner, is operated in reverse directions by means of switches 34 and 36 which apply the battery voltage in opposite directions to the motor 44. The motor 44 is connected to the mechanical zoom structure of the lens of the camera so as to operate the zoom structure in opposite directions when the direction of rotation of the motor 44 is reversed due to polarity reversal of the power supply batteries. Such zoom structures are conventional, the difference in the present invention being the operating switch arrangement which replaces the conventional operating switches.

The zoom mechanism may be operated by means of a slidable or pivotable switch mechanism, such as that shown for the run, lock and continuous running positions in FIGS. 2 and 3.

FIG. 4a illustrates a typical electrical circuit for operating the electrically operated shutter of a conventional-type move camera. The mechanical arrangement for the circuit of FIG. 4a is shown in FIG. 2, and the same reference numerals are used where applicable. The switches 12, 19 and 20 are interconnected with the series connection of a motor 42 and battery pack 43 as indicated in FIG. 4a. When the magnet 21 is in the lock (L) position as shown in FIG. 4a, both switches 19 and 20 are inoperable, thereby inhibiting operation of the motor 42. When magnet 21 is in the run (R) position, switch 19 is operated (that is, closed), and when trigger switch 12 is operated, the motor 42, which drives the shutter mechanism of the camera, is energized. This is the conventional mode of operation. When the magnet 21 is in the continuous (C) position, drive motor 42 is continuously energized, independent of the position of the trigger switch 12. This permits constant running of the camera for remote operation and/or to enable the operator to get into the picture.

FIG. 4b shows the mechanical layout and electrical interconnection of the switching arrangement shown in FIG. 3. The same reference numerals are used wherever applicable. The operation of the circuit of FIG. 4b is identical to that of FIG. 4a, except for the manner in which the magnet 26 is positioned relative to the switches 19 and 20.

FIG. 5 illustrates a typical circuit for controlling the zoom circuit of an electrically operated zoom camera. Switches 34 and 36, such as schematically represented in FIG. 2, are interconnected with the battery pack 43 and a zoom drive motor 44 so as to provide polarity reversal of the power supplied to the motor 42 when the respective switches 34 and 36 are operated. For example, when rocker 29 is actuated to move magnet 30 downward into communication with switches 34, the motor will be energized with positive voltage being applied to terminal 45 of the motor. This causes actuation of the motor 44 in a first direction so as to actuate the zoom lens in a first direction. When the rocker 29 is actuated to move magnet 31 downward into communication with switch 36, motor 44 is interconnected with the battery in such a manner that positive polarity is applied to terminal 46, thus causing the motor 44 to operate in the opposite direction, thereby operating the zoom lens in the opposite direction.

While it is preferred that the magnetically operated switches of FIGS. 4a, 4b and 5 be "hard wired" into the camera, the present invention can also be used with a wafertype contact assembly, such as the assembly 18 of my prior U.S. Pat. No. 3,860,937. This arrangement permits standard battery holders or the standard battery compartment of a camera to be used, without modification. A typical circuit arrangement for use with such an isolating wafer is shown, for example, in FIG. 6. The isolating wafer 50 of FIG. 6 is comprised of an insulating member 51 with electrical conductors 52, 53 located on opposite sides thereof. The electric conductors 52, 53 are preferably thin sheets and are connected to the electrical wires 54, 55 which are interconnected with the switches 12, 19 and 20 as illustrated in FIG. 6. The contact assembly 50 of FIG. 6 is schematically shown, but is preferably identical with that shown in my prior U.S. Pat. No. 3,860,937. The contact assembly 50 is inserted between a terminal of a battery installed in the camera and its associated camera power terminal. This effectively puts the series connection of the batteries and the shutter operating motor in series with electrical wires 54 and 55, thereby making the electrical circuit substantially identical, from an electrical point of view, to that shown in FIG. 4a.

The zoom control circuitry may be interconnected with conductors 52, 53 of FIG. 6, but in this event it will be necessary for the shutter system to be energized before power would be applied to the zoom controlled circuitry. In some instances this may be undesirable. Therefore, in instances where the zoom control circuitry is to be operable independent of the operation of the shutter, separate connections as indicated in FIG. 5 must be made therefor.

A further detailed description of contact assembly 50 of FIG. 6 is not given herein so as not to unduly obscure Applicant's inventive concept. Such a description is found in my prior U.S. Pat. No. 3,860,937.

Figure 7:
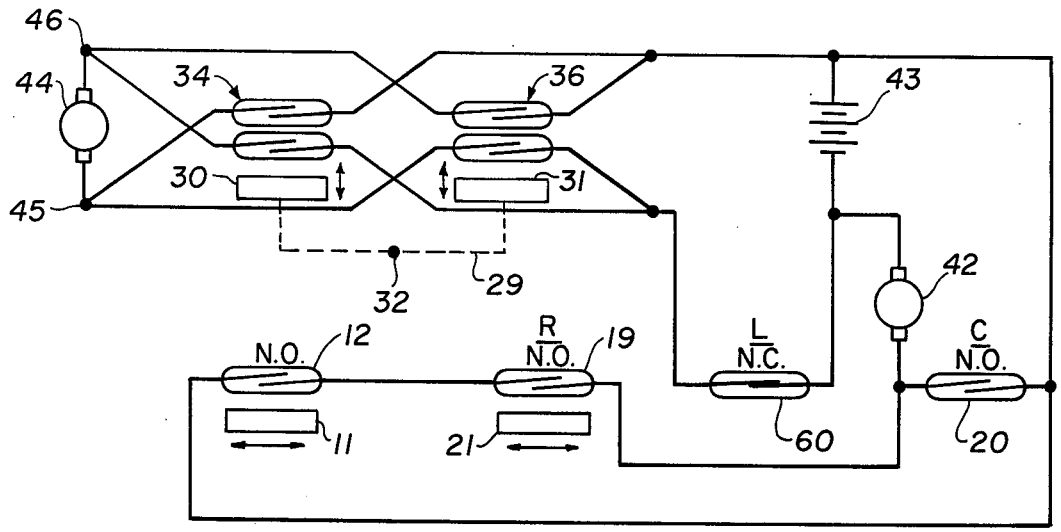
FIG. 7 illustrates a circuit for controlling the zoom, shutter and film drive mechanism while providing a positive "lock-out" for all functions.

FIG. 7 illustrates a combined circuit arrangement for the film drive and shutter mechanisms and for the lens zoom mechanism which provides a positive lock-out for all functions. Where possible, the same reference numerals have been used in FIG. 7 to designate identical elements shown in the previously discussed figures. As in the prior arrangements, magnet 21 is slidable in the direction of the arrow between the run (R), lock (L) and continuous (C) positions. Magnet 21 is shown in the run (R) position and in this position the normally open magnetic switch 19 would be actuated to its closed position. An additional magnetic switch 60, which is normally closed is located adjacent the lock (L) position of the magnet 21 so that when the magnet 21 is adjacent switch 60 and in magnetic communication therewith, switch 60 opens. This effectively opens the circuit to the zoom motor 44 and prevents this mechanism from being operated. Also, when magnet 21 is in the lock (L) position, switches 19 and 20 are not actuated and remain in their normally open position. This therefore effectively inhibits all electrical functions of the camera. The operation of the circuit in the R and C positions is essentially similar to the circuits described hereinabove.

Figure 8:
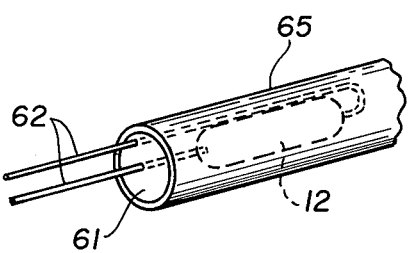
FIG. 8 is a partial view of a tubular structure for mounting of the magnetic switches to the camera housing.

FIG. 8 illustrates a typical manner in which the switches 12, 19 and 20, and, if applicable, switch 60, are mounted within a tubular structure 65, for example in the shape of a conventional straw. Only a portion of the tubular structure 65 is shown with switch 12 mounted therein. The remaining switches and their interconnected wirings are within the tubular structure 65 which is sealed at both ends by means of, for example, an epoxy 61 or other sealing material. The wires 62 (only two being shown for convenience) are connected to the camera circuitry.

Figure 9:
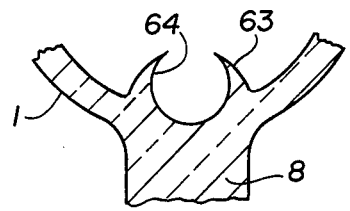
FIG. 9 shows a portion of the camera housing for receiving the tubular structure of FIG. 8.

FIG. 9 shows a partial sectional view of a portion of the camera housing 1 for removably receiving the tube 65. An inner portion of the camera housing 1 adjacent the handle portion 8 has projections 63 forming a partial circular elongated receptacle 64 for slidably receiving the tubular member 65 therein. This is advantageous when removing the camera mechanism from the housing, for example when servicing.

It should be clear that switches 34 and 36, in the zoom control circuitry, could be arranged and mounted in the camera housing similar to the manner shown in FIGS. 8 and 9. It should further be clear that a single pivoting magnet, such as the construction shown in FIG. 3, could be used to operate the zoom control switches 34 and 36.

While the invention has been described in connection with specific apparatus, various alterations and modifications can be made thereto within the scope of the invention as defined in the accompanying claims. For example, the camera housing need not be the shape shown. It may take any shape, such as cylindrical or the like. Additionally, the magnetic operating means, such as shown in FIGS. 2a and 3, may be varied in specific details within the scope of the claims to perform equivalent functions. Still further, while the invention is described in connection with a movie camera, it is equally applicable in concept to still cameras and if applicable, additional magnetic switching means can be provided to control a motor-operated film advance mechanism for a still camera.

I claim:
1. A submersible camera comprising:
a camera having an electrically operated film drive and shutter mechanism and an electrically operated zoom lens mechanism;
housing means defining a sealed chamber for receiving and housing said camera therein, said housing means having at least a portion which allows a magnetic field to pass therethrough and having at least a transparent portion in registration with the zoom lens of said camera;
first magnetically operated switching means located within said chamber of said housing means without physically penetrating through said housing means, said first switching means being electrically connected in an electrical operating circuit of said camera for selectively opening and closing an electrical circuit of at least the shutter mechanism of said camera to thereby selectively operate the shutter of said camera;
first magnetic means located outside of said housing means and adapted to be located in selective magnetic communication with said first switching means, without physically penetrating through said housing means, to close said first switching means and operate said shutter of said camera, said first magnetic means comprising:
a trigger member carrying a first permanent magnet adjacent an outer surface of said housing means, said trigger member being selectively operable to slide said first permanent magnet along said outer surface of said housing means between a first "inoperative" position spaced in the direction of sliding movement thereof out of magnetic communication with said first switching means and a second "operative" position wherein said permanent magnet is located opposite to and in registration with said first switching means with a wall of said housing means interposed therebetween so as to be in magnetic communication with said first switching means to thereby close said first switching means; and
means biasing said trigger member toward said second inoperative position of said first permanent magnet;
second magnetically operated switching means including at least first and second magnetically operated switches located within said chamber of said housing means without physically penetrating through said housing means, said second switching means being connected in an electrical operating circuit of said zoom lens mechanism of said camera for selectively opening and closing the electrical operating circuit of said zoom lens mechanism to thereby selectively operate said zoom lens mechanism; and
second magnetic means located outside of said housing means and adapted to be located in selective magnetic communication with said at least first and second magnetically operated switches of said second switching means, without physically penetrating through said housing means, to selectively close at least one of said first and second magnetically operated switches of said second switching means to selectively operate said zoom lens mechanism, said second magnetic means comprising:
at least a second permanent magnet adjacent an outer surface of said housing means and being movable between a first inoperative position spaced from at least one switch of said second switching means and a second operative position wherein said permanent magnet is located opposite to and in registration with said at least one switch of said second switching means so as to be in magnetic communication therewith through said housing means to thereby close said at least one switch; and
means biasing said second permanent magnet towards said inoperative position thereof.

2. A submersible camera according to claim 1 wherein said sealed chamber comprises an openable portion for enabling access to the camera mechanism.

3. A submersible camera according to claim 1 including means for slidably mounting said trigger member for slidable movement along the outer surface of said housing means.

4. A camera housing according to claim 1 including means within said chamber for releasably mounting said magnetically operated switches to a wall of said housing.

5. A submersible camera according to claim 1 wherein each of said magnetically operated switches are reed relays.

6. A submersible camera according to claim 1 wherein said first and second magnetically operated switches of said second switching means each include multiple contact magnetically operated switching arrangements coupled in said electrical operating circuit of said zoom lens mechanism to apply opposite polarity voltage to a drive motor of said zoom lens mechanism when respective ones of said first and second switches of said second switching means is operated.

7. A submersible camera according to claim 1 further comprising magnetically operated control means including:
at least one normally open magnetically operated control switch located within said chamber of said housing means without physically penetrating through said housing means, said control switch being connected in the electrical operating circuit of said camera and in series with said first switching means for selectively opening and closing said electrical circuit of at least the shutter mechanism of said camera to selectively provide a lock-out to prevent operation of said camera shutter; and
control magnet means located outside of said housing means and adapted to be located in selective magnetic communication with said control switch of said control means, without physically penetrating through said housing means, to selectively close said control switch of said control means to enable operation of said camera shutter under control of said first switching means, said control magnet means including at least a further permanent magnet adjacent an outer surface of said housing means and being operable between at least a first "inoperative" position spaced from said control switch of said control means and a second "operative" position wherein said further permanent magnet is located opposite to and in registration with said control switch of said control means so as to be in magnetic communication therewith through said housing means to thereby close said control switch of said control means.

8. A submersible camera according to claim 7 wherein said control magnet means includes means for sliding said further permanent magnet substantially along the outer surface of said housing means between said inoperative and operative positions thereof.

9. A submersible camera according to claim 7 wherein said magnetically operated control means includes a further normally open magnetically operated control switch coupled to the electrical circuit of at least the shutter mechanism of said camera for independently operating said shutter mechanism of said camera, said further control switch being located within said housing, spaced from said first-mentioned control switch and in selective communication with said further permanent magnet of said control magnet means, said further permanent magnet being operable between at least a third "continuous-run" position wherein said further permanent magnet is located opposite to and in registration with said further control switch so as to be in magnetic communication therewith through said housing to thereby close said further control switch to operate said shutter independently of the position of said trigger member.

10. A submersible camera according to claim 9 comprising means for sliding said control magnet means between said first, second and third positions, said second position being intermediate said first and third position and being such that said control magnet means is out of communication with both said first-mentioned and said further control switches.

11. A submersible camera according to claim 9 comprising means for pivotally mounting said control magnet means to the outside of said housing means for slidably mounting said control magnet means for pivoting, sliding movement between at least said first, second and third positions thereof.

12. A submersible camera according to claim 7 comprising means for pivotally mounted said control magnet means to the outside of said housing means for slidably mounting said control magnet means for pivoting, sliding movement between at least said first and second positions thereof.

13. A submersible camera comprising:
a camera having an electrically operated film drive and shutter mechanism;
housing means defining a sealed chamber for receiving and housing said camera therein, said housing means having at least a portion which allows a magnetic field to pass therethrough and having at least a transparent portion in registration with the lens of said camera;
first magnetically operated switching means located within said chamber of said housing means without physically penetrating through said housing means, said first switching means being electrically connected in an electrical operating circuit of said camera for selectively opening and closing an electrical circuit of at least the shutter mechanism of said camera to thereby selectively operate the shutter of said camera;
first magnetic means located outside of said housing means and adapted to be located in selective magnetic communication with said first switching means, without physically penetrating through said housing means, to close said first switching means and operate said shutter of said camera, said first magnetic magnetic means comprising:
a trigger member carrying a first permanent magnet adjacent an outer surface of said housing means, said trigger member being selectively operable to slide said first permanent magnet along said outer surface of said housing means between a first inoperative position spaced in the direction of sliding movement thereof out of magnetic communication with said first switching means and a second operative position wherein said permanent magnet is located opposite to and in registration with said first switching means with a wall of said housing means interposed therebetween so as to be in magnetic communication with said first switching means to thereby close said first switching means; and
means biasing said trigger member toward said second inoperative position of said permanent magnet;
magnetically operated control means including:
at least one normally open magnetically operated control switch located within said chamber of said housing means without physically penetrating through said housing means, said control means being connected in the electrical operating circuit of said camera and in series with said first switching means for selectively opening and closing said electrical circuit of at least the shutter mechanism of said camera to selectively provide a lock-out to prevent operation of said camera; and control magnet means located outside of said housing means and adapted to be located in selective magnetic communication with said control switch of said control means, without physically penetrating through said housing means, to selectively close said control switch of said control means to enable operation of said camera shutter under control of said first switching means, said control magnet means including at least a further permanent magnet adjacent an outer surface of said housing means and being operable between at least a first inoperative position spaced from said control switch of said control means and a second operative position wherein said further permanent magnet is located opposite to and in registration with said control switch of said control means so as to be in magnetic communication therewith through said housing means to thereby close said control switch of said control means.

14. A submersible camera according to claim 13 wherein said control magnet means includes means for sliding said further permanent magnet substantially along the outer surface of said housing means between said inoperative and operative positions thereof.

15. A submersible camera according to claim 13 wherein said magnetically operated control means includes a further normally open magnetically operated control switch coupled to the electrical circuit of at least the shutter mechanism of said camera for independently operating said shutter mechanism of said camera, said further control switch being located within said housing, spaced from said first-mentioned control switch and in selective communication with said further permanent magnet of said control magnet means, said further permanent magnet being operable between at least a third "continuous-run" position wherein said further permanent magnet is located opposite to and in registration with said further control switch so as to be in magnetic communication therewith through said housing to thereby close said further control switch to operate said shutter independently of the position of said trigger member.

16. A submersible camera according to claim 15 comprising means for sliding said control magnet means between said first, second and third positions, said second position being intermediate said first and third position and being such that said control means is out of communication with both said first-mentioned and said further control switches.

17. A submersible camera according to claim 15 comprising means for pivotally mounting said control magnet means to the outside of said housing means for slidably mounting said control magnet means for pivoting sliding movement between at least said first, second and third positions thereof.

18. A submersible camera according to claim 13 comprising means for pivotally mounting said control magnet means to the outside of said housing means for slidably mounting said control magnet means for pivoting, sliding movement between at least said first and second positions thereof.

19. A submersible camera according to claim 13 wherein said firt switching means and said at least one control switch are both mounted within a tubular structure, said housing including means for removably receiving said tubular structure.

20. A submersible camera according to claim 13 wherein said camera includes an electrically operated zoom lens mechanism and magnetically operated switching means electrically coupled in an electrical circuit of said zoom lens mechanism for control thereof, and wherein said magnetically operated control means includes a zoom lens control switch coupled in the electrical circuit of said zoom lens mechanism for selectively disabling said zoom lens mechanism, said zoom lens control switch being mounted within said housing in registration with said second position of said control magnet means so as to be selectively actuated by said control magnet means when it is in said second position.

21. A submersible camera according to claim 20 wherein said zoom control switch is a normally closed switch which is opened when said control magnet means is in said second position to thereby inhibit operation of said zoom lens mechanism.

* * * * *